US007600195B2

(12) United States Patent
Greer

(10) Patent No.: US 7,600,195 B2
(45) Date of Patent: Oct. 6, 2009

(54) SELECTING A MENU OPTION FROM A MULTIPLICITY OF MENU OPTIONS WHICH ARE AUTOMATICALLY SEQUENCED

(75) Inventor: Timothy D. Greer, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 11/285,492

(22) Filed: Nov. 22, 2005

(65) Prior Publication Data
US 2007/0118814 A1    May 24, 2007

(51) Int. Cl.
G06F 3/048    (2006.01)
(52) U.S. Cl. .................... 715/811; 715/814; 715/825
(58) Field of Classification Search ......... 715/810–814, 715/729, 830, 835, 730, 825
See application file for complete search history.

(56) References Cited

U.S. PATENT DOCUMENTS

| | | | | | |
|---|---|---|---|---|---|
| 4,667,293 | A | * | 5/1987 | Krieger et al. ................ | 705/12 |
| 5,363,481 | A | * | 11/1994 | Tilt ............................ | 715/814 |
| 5,574,798 | A | * | 11/1996 | Greer et al. ................. | 382/100 |
| 5,642,430 | A | * | 6/1997 | Greer et al. ................. | 382/100 |
| 5,892,511 | A | * | 4/1999 | Gelsinger et al. ........... | 715/794 |
| 6,047,317 | A | * | 4/2000 | Bisdikian et al. ........... | 725/142 |
| 6,222,541 | B1 | | 4/2001 | Bates et al. ................. | 345/341 |
| 6,246,406 | B1 | * | 6/2001 | Nielsen et al. .............. | 715/781 |
| 6,388,686 | B1 | * | 5/2002 | Hetherington et al. ...... | 715/810 |
| 6,600,936 | B1 | | 7/2003 | Karkkainen et al. ........ | 455/566 |
| 6,618,063 | B1 | | 9/2003 | Kurtenbach ................. | 345/834 |

(Continued)

OTHER PUBLICATIONS

Martinez, SJ; "Graphical Representation of Location in Menu Hierarchy," TDB v. 39 n5, May 1996, pp. 3-4.

(Continued)

Primary Examiner—Tadeese Hailu
(74) Attorney, Agent, or Firm—Geraldine D. Monteleone, Esq.; Blanche E. Schiller, Esq.; Heslin Rothenberg Farley Mesiti P.C.

(57) ABSTRACT

System, method and program for user selection of a menu option. A multiplicity of menu options are automatically and sequentially displayed, one at a time, in a display window of a computing device. A user selection is received at a time during the automatic and sequential display of the menu options. A determination is made which of the menu options corresponds to the user selection based on the time that the user selection was received in relation to time periods during which the menu options were displayed. Optionally, there is a two step process to selecting a menu option. Display of a corresponding menu option is temporarily frozen in the window. A predetermined time period is waited for receipt of confirmation from the user that the user wants to select the corresponding menu option which is frozen in the window. If, within the predetermined time period, the user confirms that the user wants to select the corresponding menu option, a determination is made that the user has selected the corresponding menu option. However, if, within the predetermined time period, the user does not confirm that the user wants to select the corresponding menu option, a determination is made that the user has not selected the corresponding menu option, and sequential display of the multiplicity of menu options is resumed.

10 Claims, 6 Drawing Sheets

U.S. PATENT DOCUMENTS

| | | | |
|---|---|---|---|
| 6,643,651 B1* | 11/2003 | Pearsall | 707/10 |
| 6,683,627 B1 | 1/2004 | Ullmann et al. | 345/786 |
| 6,877,007 B1 | 4/2005 | Hentzel et al. | 707/10 |
| 6,904,450 B1* | 6/2005 | King et al. | 709/203 |
| 7,218,312 B2* | 5/2007 | Takaku | 345/158 |
| 7,224,409 B2* | 5/2007 | Chin et al. | 348/732 |
| 2002/0085042 A1 | 7/2002 | Matthews, III et al. | 354/810 |
| 2004/0075693 A1 | 4/2004 | Moyer et al. | 345/810 |
| 2004/0217990 A1* | 11/2004 | Chen et al. | 345/810 |
| 2005/0010594 A1 | 1/2005 | Chen et al. | 707/104.1 |
| 2005/0024322 A1 | 2/2005 | Kupka | 345/156 |

OTHER PUBLICATIONS

Doidge, DA et al; "MPEG Menu Manager," TDB v. 38, n9, Sep. 1995, pp. 291-296.

Najjar, LJ, "Boolean Desktop Object Selection," TDB v. 37, n12, Dec. 1994, pp. 235-236.

Beaton, CB et al., "Hardware Failure Simulator," TDB v37, n6B, Jun. 1994, pp. 627-638.

Franklin, SM et al., "Graphic Object Processor," TDB, Nov. 1989, p. 325.

* cited by examiner

| MENU OPTION ID | DISPLAYED TEXT / SYMBOLS | DISPLAY TIME |
|---|---|---|
| APPLICATION POINTER | NEXT MENU OPTION LINK POINTER | PREVIOUS MENU OPTION LINK POINTER |

SELECTING A MENU OPTION FROM A MULTIPLICITY OF MENU OPTIONS WHICH ARE AUTOMATICALLY SEQUENCED

FIELD OF THE INVENTION

The present invention relates generally to computing devices, and more specifically to a user interface for a desk top computer, lap top computer, PDA, server, cell phone or other type of hand held computing device.

BACKGROUND OF THE INVENTION

Computing devices such as desk top computers, lap top computers, servers, personal digital assistants ("PDAs"), cell phones and other types of hand held computing devices, are well known today. Each such computing device includes a user interface to control the device including all computer programs within the device. Known user interfaces include a visual display to display information, command options, web pages with links to other web pages, lists of URLs in a "book-mark" list, etc. A known "pull-down" or "drop down" menu typically includes multiple command options or links, arranged in a column. The user interface also typically includes a mouse and keyboard to make selections from the display, such as to select a command option or link which is displayed. Some user interfaces also include voice recognition software to recognize user commands or selections which are spoken.

U.S. Pat. No. 6,388,686 discloses a rotate user control to selectively change the current display item within a group of display items. Each actuation of the rotate control changes the current display item from one item to a next item within an internally non repeating, ordered sequence loop of all candidate display items. Each display item within the group is displayed in turn. An indicator provides a visual cue to the user of which display item is currently selected for display.

US2004/0217990A1 discloses a Drop Down Menu Program having an Item Selection Program, a Sorting Program, and a Recall Program. The Item Selection Program eliminates the need for the user to hold down the shift key or the control key while making multiple selections. Instead, the user may activate a menu item to highlight it, and activate the menu item again to remove the highlight. The user may also open and close the drop down menu. The Sorting Program organizes the menu items in order of frequency of use. The Sorting Program also provides ascending and descending sort buttons that allow the user to sort the menu items in ascending or descending alphabetical, numeric, or chronological order. The Recall Program creates a recall list of selected menu items when the user activates a recall button. The recall list can be displayed and removed independent of opening and closing actions of the drop down menu.

U.S. Pat. No. 5,363,481 discloses an auto selecting scrolling device for viewing and making selection of a parameter from a menu. When a device, used to scroll through a menu, is activated the menu appears. A timer with a user preset time limit is started. As long as the scrolling device is being used to scroll through the parameters in the menu, the timer is reset. While the scrolling is taking place, the parameters are not only highlighted but also magnified. If the menu is no longer being scrolled through, then the timer expires upon attaining the user set limit. When the timer expires, the last highlighted parameter is selected and the menu is closed.

An object of the present invention is to facilitate user selection of menu options.

SUMMARY

The present invention relates to a system, method and program for user selection of a menu option. A multiplicity of menu options are automatically and sequentially displayed, one at a time, in a display window of a computing device. A user selection is received at a time during the automatic and sequential display of the menu options. A determination is made which of the menu options corresponds to the user selection based on the time that the user selection was received in relation to time periods during which the menu options were displayed.

The user selection may correspond to one of said menu options which was displayed at the time that the user selection was received. If the user selection was received within a predetermined period after one of the menu option in the sequence ceased to be displayed in the display window, the user selection may correspond to the one menu option.

In accordance with an optional feature of the present invention, the respective time periods during which respective menu options are displayed can be adjusted based on relative frequency with which the respective menu options have been selected. For example, the menu option which has been selected most frequently may have a longer display time than other menu options which have been selected less frequently.

In another embodiment of the present invention, there is a two step process to selecting a menu option. Display of a corresponding menu option is temporarily frozen in the window. A predetermined time period is waited for receipt of confirmation from the user that the user wants to select the corresponding menu option which is frozen in the window. If, within the predetermined time period, the user confirms that the user wants to select the corresponding menu option, a determination is made that the user has selected the corresponding menu option. However, if, within the predetermined time period, the user does not confirm that the user wants to select the corresponding menu option, a determination is made that the user has not selected the corresponding menu option, and sequential display of the multiplicity of menu options is resumed.

DETAILED DESCRIPTION OF THE PREFERRED EMBODIMENTS

Figure 1:
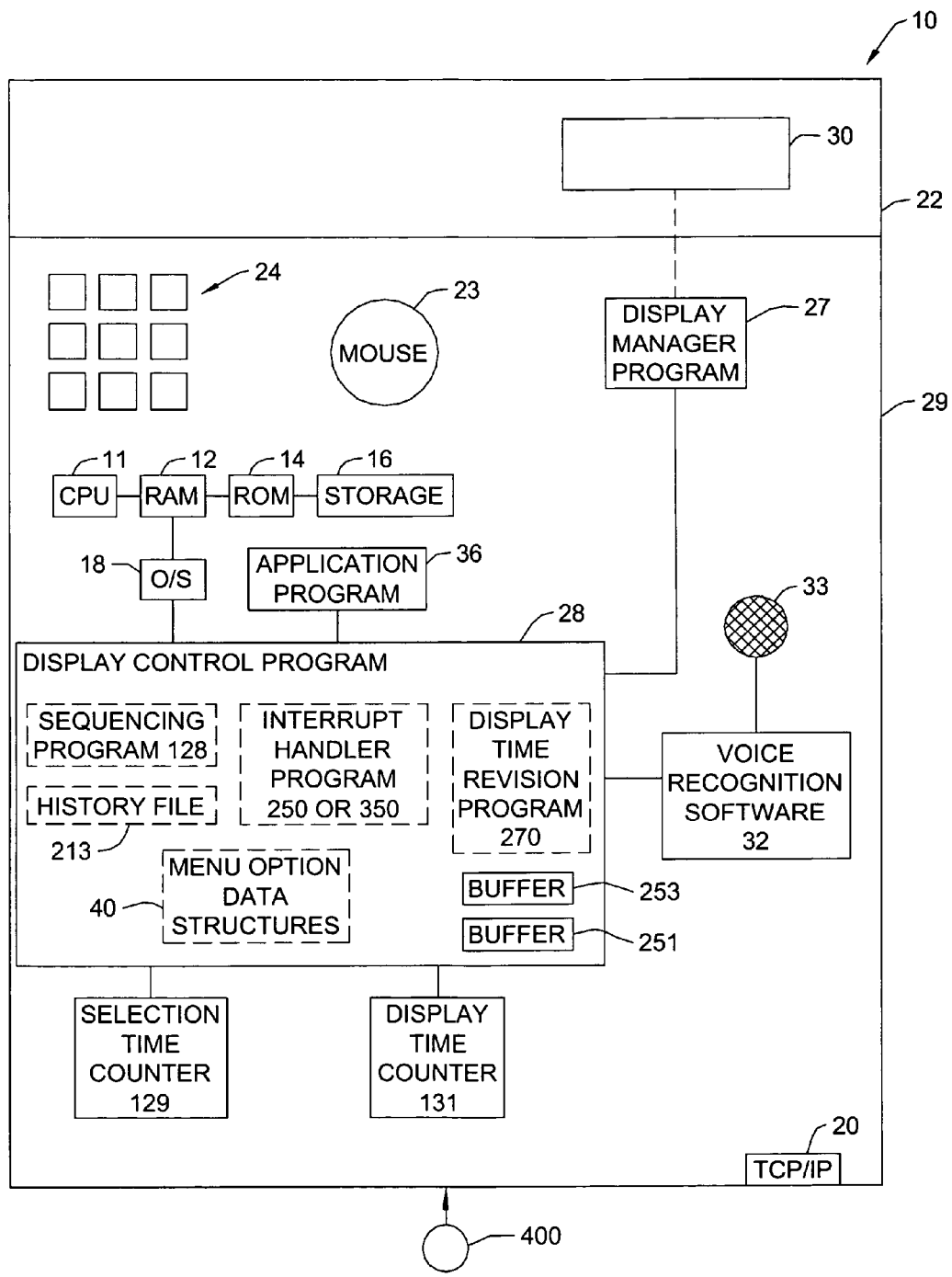
FIG. 1 is a block diagram of a computing device which incorporates the present invention.

The present invention will now be described in detail with reference to the figures. FIG. 1 illustrates a computing device 10 such as a desk top computer, lap top computer, server, PDA, cell phone or other type of hand held computing device. Computing device 10 includes known CPU 11, RAM 12, ROM 14, storage 16, operating system 18, TCP/IP adapter card 20, display device 22 (such as a CRT or LCD), mouse 23 (either integrated into a housing 29 of device 10 as shown or external to the housing), and keyboard 24 (either integrated into the housing of device 10 as shown or external to the housing). The keyboard 24 can be a full alphanumeric keyboard, alphabetic characters only, numbers only, a telephone type keyboard with number pads 0-9, with each pad also representing three or four alphabetic letters, etc. A known display manager program 27 displays images on display device 22 (such as option menus, web pages and information) as instructed by various programs that execute within computer device 10 or remote computers (not shown). Computing device 10 also includes known voice recognition software 32 which recognizes audible commands spoken by a user and detected by a microphone 33. By way of example, voice recognition software 32 can comprise a known IBM ViaVoice programs.

Figures 2, 3:
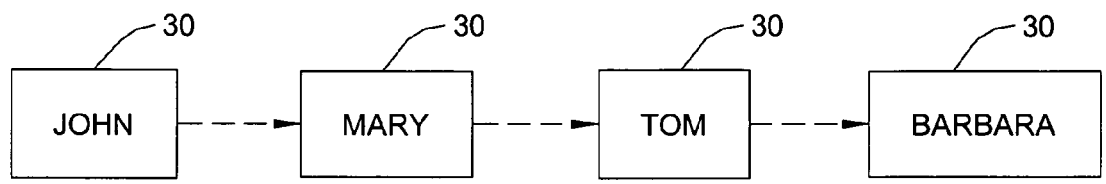
FIG. 2 illustrates four menu options which are sequentially displayed, one at a time, in a display window of the computing device of FIG. 1, according to the present invention.
FIG. 3 is data structure representing a menu option.

Computer device 10 also includes a display control program 28 according to the present invention. Display control program 28 (by appropriate instruction to display manager program 27) causes display device 22 to graphically display a window 30. Display control program 28 (by appropriate instruction to the display manager program 27) also causes a series of menu options to sequence through window 30, preferably one at a time, until a user selects one of the menu options. In other words, program 28 causes display of a first one of the menu options (such as a name "John" as illustrated in FIG. 2) in the series in window 30 first. Next, assuming the user has not selected the first menu option, program 28 causes display of a second one of the menu option (such as a name "Mary" as illustrated in FIG. 2) in the series to be displayed in window 30 second. Next, assuming the user has not selected the second menu option, program 28 causes a third one of the menu options (such as a name "Tom" as illustrated in FIG. 2) to be displayed in the series in window 30, third. Next, assuming the user has not selected the third menu option, program 28 causes a fourth one of the menu options (such as a name "Barbara" as illustrated in FIG. 2) to be displayed in the series in window 30, fourth. If the user has not selected one of the menu options in the sequence during the first iteration of the entire sequence, program 28 repeats the foregoing process sequentially displaying the entire sequence of menu options again, one at a time. Program 28 repeats the foregoing process until the user selects one of the menu options in the sequence.

The user can select one of the menu options in a variety of manners, although typically the user makes the selection by audible command (detected by voice recognition software 32). Thus, when the menu option that the user wants to select appears in the window 30, the user can speak an audible command such as "select" or "yes" or any other term programmed into display control program 28 to indicate selection of the menu option which is currently displayed. Alternately, when the menu option that the user wants to select appears in the window 30, the user can select the menu option by pressing a button on the mouse 23 (regardless of where the mouse points) or pressing a button on the keyboard 24 (or another type of input device). Program 28 also allows a finite amount of user response time, i.e. time between display of the menu option and (a) the user's observance of the menu option, (b) the user's decision to make the selection and (c) the user's action to make the selection (such as speaking the command). Thus, program 28 extends the time period for a user to select the menu option which was just displayed a short time after the menu option ceases to be displayed. Consequently, a user selection made within a predetermined response time period after the menu option ceases to be displayed is considered a selection of the menu option. By way of example, the predetermined response time extension is 0.2 seconds. During the response time extension, in one embodiment of the present invention, the window 30 is blank, and in another embodiment of the present invention, the window 30 displays the next menu option in the sequence. In the latter embodiment of the present invention, the response time extension should be shorter than the fastest response time of a user to the initial display of the next menu option. This will prevent the user, when viewing this next menu option, from inadvertently selecting the previous menu option (which was just erased). In response to the selection of a menu option, display control program 28 notifies an application program 36 (or other type of computer program), and the application program 36 responds to the selection. By way of example, application program 36 can automatically dial a telephone number to call a person or business identified by the selected menu option. The function of application 36 is not important to the present invention. As other examples, application program 36 can invoke another menu display program such as a sub-menu.

As noted above, the menu options sequence through the window 30. If the sequence rate is significant, the response time of some users may be too slow to consistently and reliably select a desired menu option, even with the response time extension. In an alternate embodiment of the present invention, to ensure that the user operatively selects only the menu option that the user intends to select, the user operatively selects one of the menu options in a two step process. During the sequencing of the menu options, when the user speaks an audible command such as "yes" or any other selection term programmed into display control program 28, program 28 causes continued display or "freezing" in window 30 of the corresponding menu option. Thus, if the user spoke the audible command (a) during display of a "current" menu option after expiration of the response time extension associated with the previous menu option or (b) during display of the next menu option during the response time extension of the "current" menu option, then program 28 will cause the "current" menu option to continually appear or "freeze" in window 30. If this is the menu option that the user wants to select, then the user speaks the same audible command again or another audible command such as "confirm" or "select", to conclusively select this menu option. However, if this is not the menu option that the user wants to select, then the user speaks another audible command such as "no" or "wrong" or any other term programmed into display control program 28 to cause program 28 to resume sequencing through the series of menu options without accepting selection of the menu option which was temporarily "frozen" in window 30. Alternately, if the user avoids speaking any audible command for a predetermined time-out period after the "current" menu option is initially displayed in window 30, then program 28 concludes that the user does not want to select this menu option which is currently frozen in window 30, and continues sequencing through the series of menu options. In this two step process for selecting a menu option, the user can alternatively make both commands, i.e. the initial identification and subsequent confirmation or selection by keyboard or mouse entry (although typically both commands are made audibly).

Program 28 also includes another optional function to change the durations that some of the menu options are displayed, based on past experience. For example, if the user has selected one of the menu options more frequently than others, then program 28 can display the one menu option for a longer period of time than the others in the sequence. This will permit a longer response time for the user for the most likely candidate. Program 28 can likewise shorten the response time for the other menu options, so the overall time to sequence through all the menu options remains fixed.

As explained above, FIG. 2 illustrates a series of four different menu options that appear, one at a time, in window 30. In this example, the menu options are names of people that the user may wish to call via computing device 10 in the form of a cell phone. However, it should be understood that the nature of the menu options and their effect depend on the function of application 36, and the menu options of FIG. 2 are just one example. As another, the menu options can be configuration options for the electronic device.

FIG. 3 illustrates an example of a data structure 40 corresponding to each menu option that is displayed in window 30. Data structure 40 can be a double-linked list specifying: menu option ID, display text/symbol, display time, application pointer, next menu option link pointer and previous menu option link pointer. The "menu option ID" is a unique identifier which identifies the menu option. The "display text/symbol" is the actual text or symbol which is displayed in the window 30 as the menu option viewed by user. The "display time" is the amount of time that the menu option (i.e. the actual text or symbol) is displayed. The "application pointer" is the address of application 36 or other computer program to respond to selection of the menu option. The call to the application 36 includes the "menu option ID" to inform application 36 of the menu option which is selected so that application 36 will know how to respond to the selection. The "next menu option link pointer" is a pointer to the data structure for the next menu option in the sequence. The "previous menu option link pointer" is a pointer to the data structure for the previous menu option in the sequence.

Figure 4:
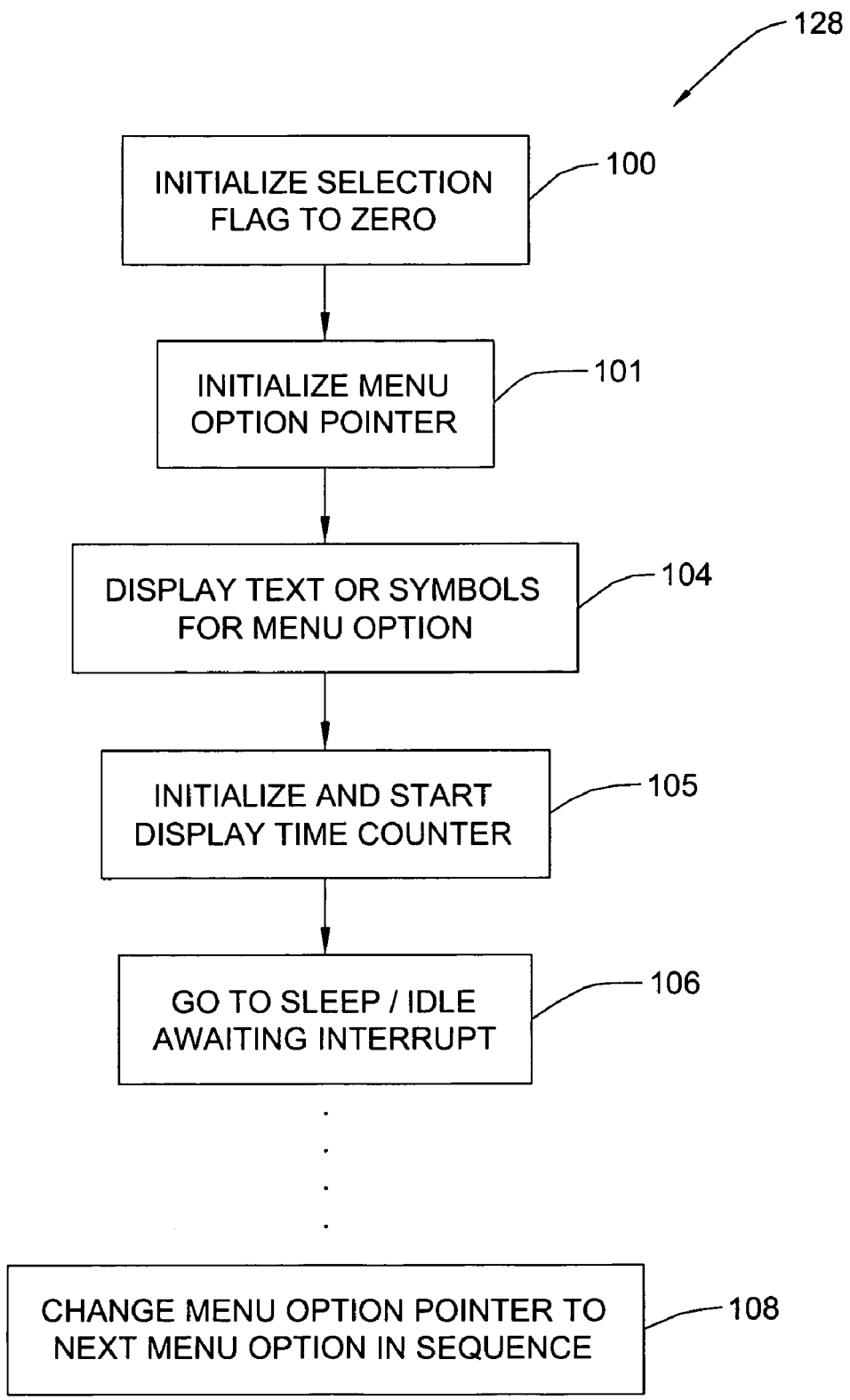
FIG. 4 is flowchart of a menu option sequencing program portion of a display control program, according to the present invention, within the computing device of FIG. 1.

FIG. 4 illustrates a menu option sequencing program 128 which is part of program 28. (Sequencing program 128 can be a separate program thread in a multitasking operating system.) In step 100, sequencing program 128 is activated and initializes a "selection flag" to zero to indicate that the user has not yet selected a menu option. (The state of the selection flag is relevant when the interrupt handler 350 is used.) Next, sequencing program 128 initializes a menu option pointer to point to the data structure for the first menu option in the sequence (step 101). Next, sequencing program 128 (by a call to display manager program 27) causes display in window 30 of the first menu option in the sequence for the time duration specified in its data structure (step 104). Next, sequencing program 128 starts a display time counter 131 corresponding to the display time specified in the data structure for the first menu option in the sequence (step 105). Next, sequencing program 128 goes to "sleep" (or "idle mode") in which it remains idle waiting for an interrupt to wake it up (step 106).

System 10 can generate two types of interrupts of interest to program 28. If the display time counter 131 counts down to zero, then the display time counter 131 will generate a corresponding interrupt indicating it is time to display the next menu option in the sequence. Also, if a user makes a selection, either by voice, keyboard or mouse command, then the operating system 18 will generate a corresponding interrupt indicative of the selection. Program 28 also includes an interrupt handler program 250 or 350 to handle both types of interrupts. (Program 250 and 350 can also be embodied in a respective program thread in a multitasking operating system.)

Figure 5:
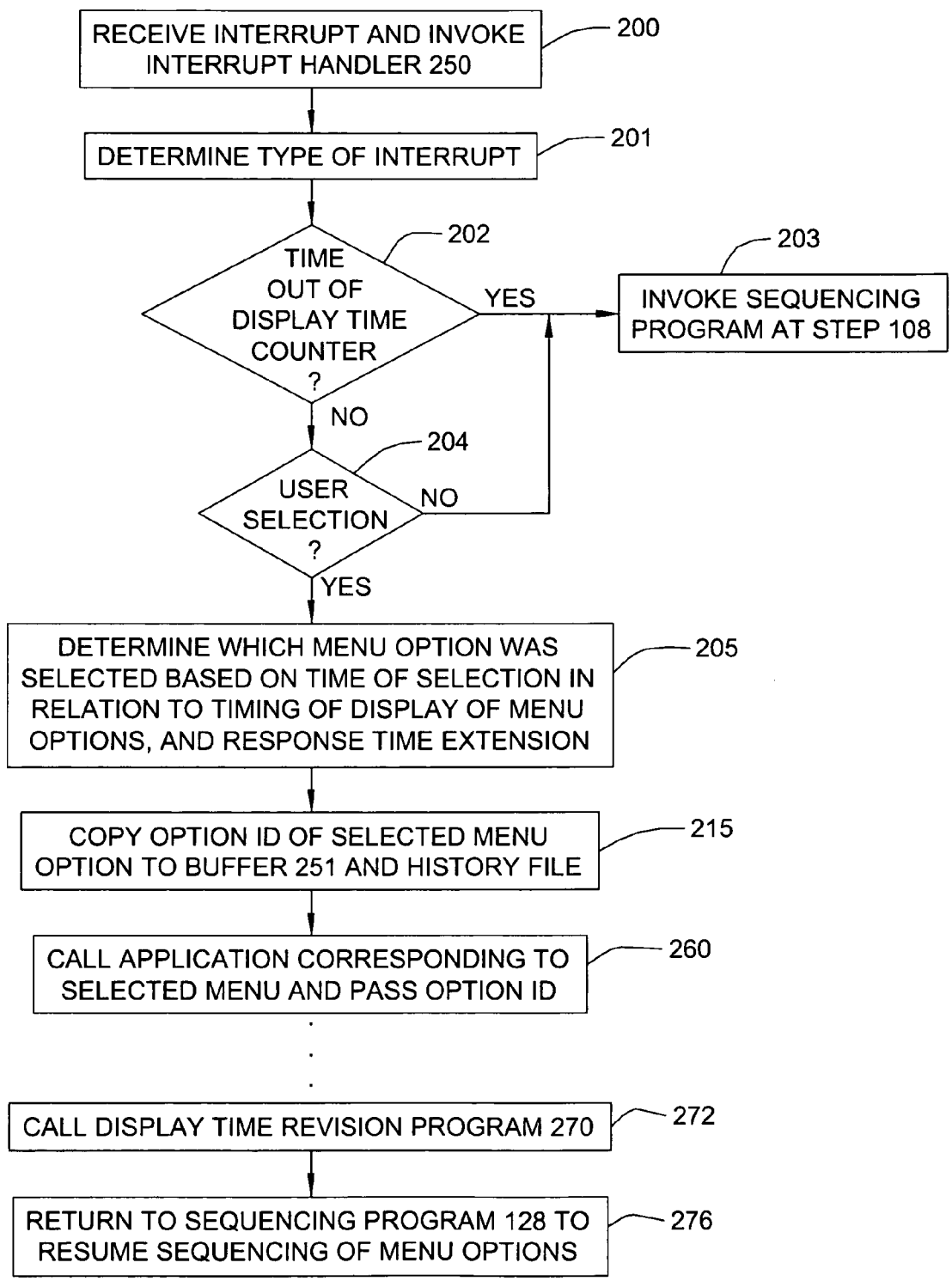
FIG. 5 is a flowchart of an interrupt handler program portion of the display control program, according to one embodiment of the present invention, which is another part of the display control program of FIG. 4.

FIG. 5 illustrates interrupt handler 250 in more detail. The operating system 18 invokes interrupt handler 250 when either of the foregoing two types of interrupts occur (step 200). In response, interrupt handler 250 determines the type of interrupt from a type parameter or type handling address included in the interrupt (step 201). If the interrupt was generated by the display time counter 131 indicating that the menu option has been displayed for the time duration indicated by its data structure (decision 202, yes, branch), then interrupt handler 250 wakes-up program thread 128 at step 108 (step 203). In response, program thread 128 updates the current menu option pointer to point to the data structure for the next menu option in the sequence as specified in the data structure for the first menu option (step 108). Next, program thread 128 repeats the foregoing steps 102-106 for this next (in this case, second) menu option.

Referring again to decision 202, no branch, where the interrupt was not due to lapse of the selection time counter 129, but instead was due to a selection made by the user within the selection time (decision 204, yes branch). In response, interrupt handler 250 determines what menu option that the user selected (step 205). This is based on the time the selection was made in relation to the time period when the menu option was displayed (as indicated by time counter 131) and the corresponding response time extension. For purposes of explanation, assume that menu options A, B and C are first, second and third, respectively, in the sequence of display of menu options. If the current time indicated by the time counter 131 indicates that the selection was made during display of menu option B, after expiration of the response time extension associated with the previous menu option A, then interrupt handler 250 concludes that menu option B was selected. Likewise, if the current time indicated by the time counter 131 indicates that the selection was made during display of menu option C, but during the response time extension associated with the previous menu option B, then interrupt handler 250 concludes that menu option B was selected. However, if the current time indicated by the time counter 131 indicates that the selection was made during display of menu option B but before expiration of the response time extension for menu option A, then interrupt handler 250 concludes that menu option A was selected. In this latter case, presumably, the user made the selection intending to select menu option A, but the finite response time of the user caused the selection to made shortly after (for example, <0.2 seconds after) menu option A disappeared from window 30, and was replaced by menu option B. Interrupt handler 250 copies the menu option ID of the selected menu option into a buffer 251 and a history file 213 (step 215). Each time a new Option ID is added to the history file 213, after the history file 213 contains a predetermined number of Option IDs, the oldest Option ID is discarded to maintain a constant number of Option IDs in the history file 213. History file 213 tracks which menu options have been selected and how often, as described below for purpose of adjusting the display time of the menu options to favor the most commonly selected menu option(s).

The following is one way that interrupt handler 250 can determine which menu option was selected in step 205. In this embodiment of the present invention, the response time extension extends into the time period during which the next menu option is displayed in window 30. For example, each menu option is displayed for 0.5 seconds, there is no significant blank period between display of successive menu options, and the response time extension is 0.2 seconds. In this example, the effective time period to select a menu option begins 0.2 seconds after the initial display of the menu option and lasts until 0.2 seconds after the menu option disappears from window 30 (and the next menu option appears). As noted above, sequencing program 128 resets and restarts the time counter 131 at the beginning of the display of each menu option. Interrupt handler 250 determines if the time the user made the selection, referenced to the corresponding time of the time counter 131, is less than the response time extension. If so, this indicates selection of the previously displayed menu option. However, if the selection time is greater than the response time extension, this indicates selection of this menu option. (In another embodiment of the present invention, there is a period between display of successive menu options during which the window 30 is blank, and the selection time for a menu option lasts during the full time of display of the menu option and the subsequent blank period.)

Next, interrupt handler 250 calls the application 36 or other computer program indicated by the "application pointer" of the data structure associated with the selected menu option (step 260). This application 36 or other computer program then responds to the menu option which was selected. For example, if the menu option is the name of a person that the user wishes to telephone, then the application 36 or other computer program will automatically dial the telephone number of this person and initiate the call. After the application 36 or other computer program completes its handling of the menu option selection, the application 36 or other computer program can invoke a Display Time Revision program 270 (step 272). (The inclusion and use of program 270 is optional.) The objective of program 270 is to provide a greater display time for the menu options which have been selected more frequently than other menu options. However, preferably there will be upper and lower limits for the display time of any menu option, and a fixed, total time during which all menu options in the sequence will be displayed. The following algorithm illustrates one embodiment of the display time revision program 270:

Initialize (when Display Control Program 28 is first invoked) the history file 213 uniformly, so that each menu option is included an equal number of times, or as nearly so as possible if the number of options does not divide the size of the history file 213 evenly with no remainder. Then, each time the display time revision program 270 is called,
$p(i)=\min(\max(n(i)/K, m/T), M/T)$
$d(i)=p(i) \times T/(\text{sum of all } p(i))$, where
$p(i)$=preliminary time scaling factor for menu option "i"
$d(i)$=display time for menu option "i".
K=the total number of menu option IDs listed in the history file 213.
$n(i)$=number of times that menu option "i" was selected during last "K" selections recorded in the history file 213.
T=total time in which to display all menu options.
m=minimum display time for any menu option, even a menu option that is never selected.
M=maximum display time for any menu option, even a menu option that is always selected.

After program 270 calculates the new display time for each menu option in step 272, program 270 updates the display times in the respective data structures for the respective menu options. Next, routine 270 jumps back to step 100 to resume the cycling of the menu options (step 276).

Figure 6A:
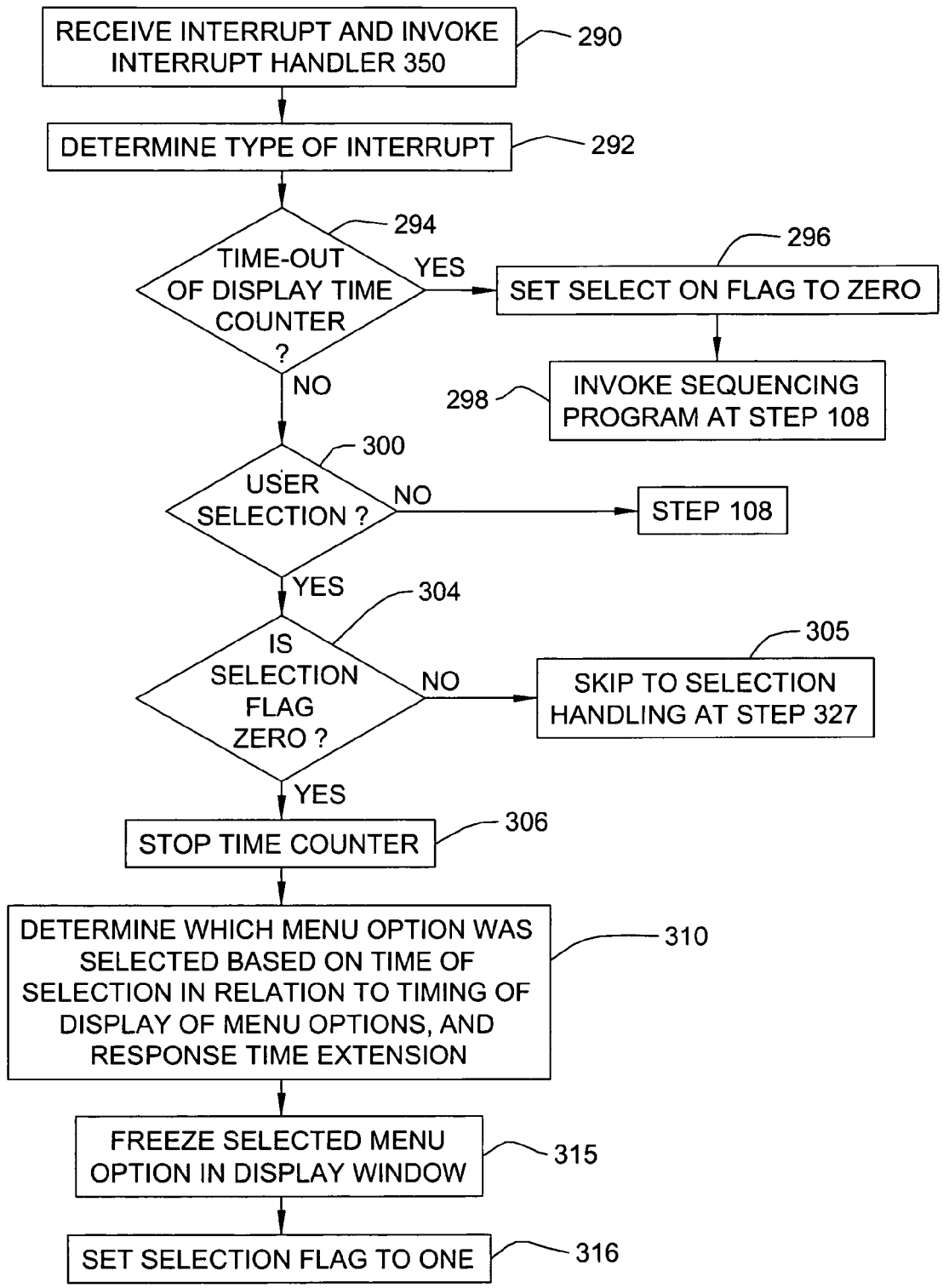
FIG. 6 is a flowchart of another interrupt handler program of the display control program, according to another embodiment of the present invention, which is another part of the display control program of FIG. 4.
Figure 6B:
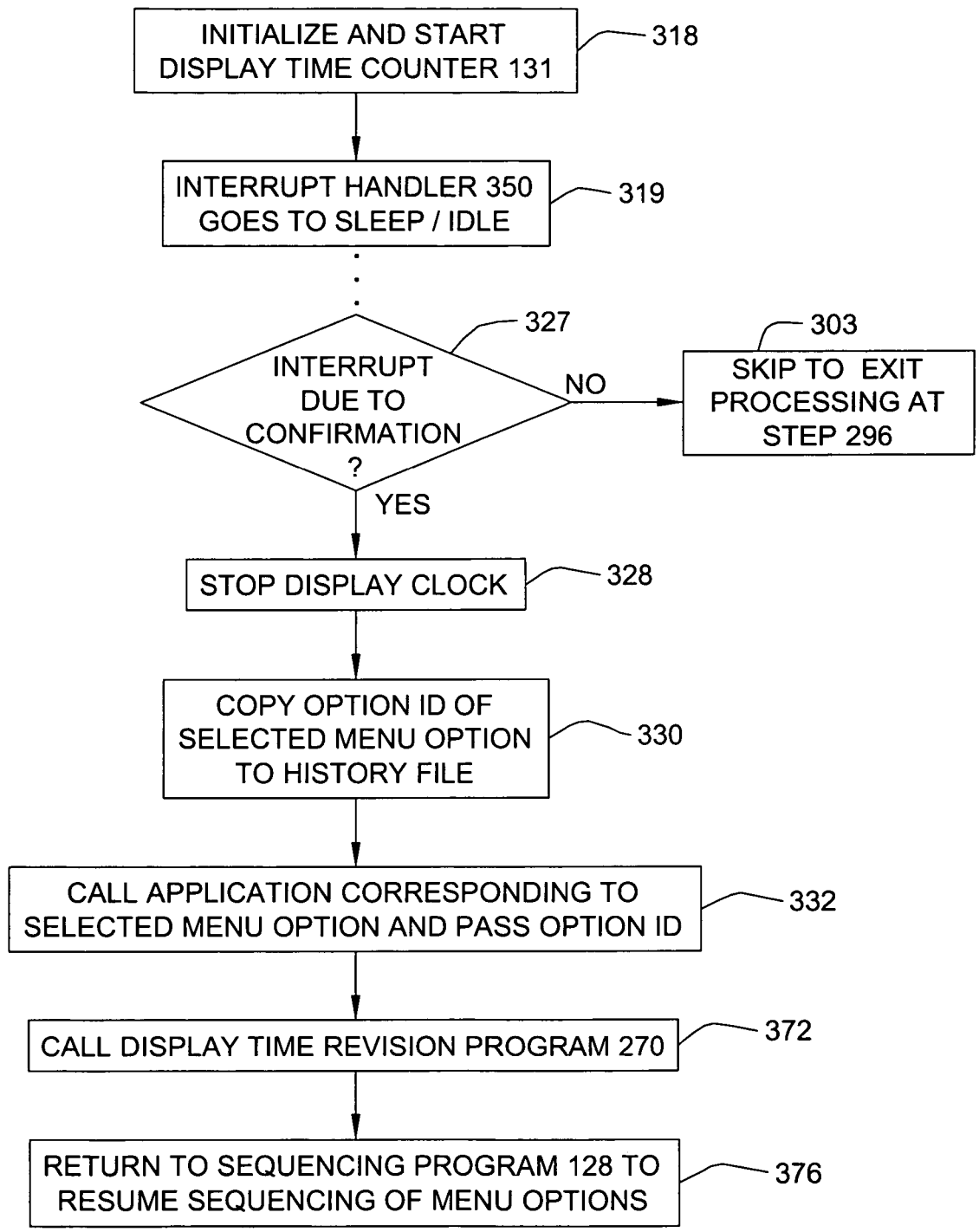

FIGS. 6(A) and 6(B) illustrate another interrupt handler 350 (instead of interrupt handler 250) in accordance with another embodiment of the present invention where there is a two step process for the user to operationally select a menu option. The basic two step process is as follows. In the first step, the user attempts to identify the user's desired menu option and temporarily "freeze" it in window 30. In the second step, the user indicates whether the menu option which has been temporarily frozen in window 30 is the menu option which the user desires to select. More specifically, in step 290, either the display time counter 131 or the operating system (in response to a selection made by the user) has sent an interrupt to interrupt handler 350. In response, interrupt handler 350 determines the type of interrupt from a type parameter or type handling address included in the interrupt (decision 292). If the interrupt was generated by the display time counter 131 indicating that the menu option has been displayed for the time duration indicated by its data structure or because the selection time has expired after the temporary freeze indicated above (decision 294, yes, branch), then the selection flag is set to zero (step 296) (irrespective of its current value) and interrupt handler 350 wakes-up program thread 128 (step 298). In response, program thread 128 updates the menu option pointer to point to the data structure for the next menu option in the sequence as specified in the data structure for the first menu option (step 108). Next, program thread 128 repeats the foregoing steps 102-106 for this next menu option.

Referring again to decision 294, no branch, where the interrupt was not due to lapse of the display time counter 131, but instead was due to a selection made by the user within the time allowed for the selection of the menu option (step 300, yes branch). If the selection flag is non-zero, then the interrupt handler skips to selection handling 327. Otherwise, the interrupt handler 350 stops the display time counter (step 306) and proceeds to determine which menu option corresponds to the user selection (step 310). This is determined exactly as described above in step 205, i.e. based on the time the selection was made, referenced to time counter 131, in relation to the time periods during which the menu options were displayed and the response time extension.

Next, interrupt handler 350 "freezes" in window 30 the foregoing menu option which was identified by the user, and which is recorded in buffer 253 (step 315). Next, interrupt handler 350 sets the selection flag equal to one (step 316). Next, interrupt handler 350 resets and starts the display time counter 131 (step 318), which establishes the maximum amount of time that the interrupt handler 350 will wait for the user to confirm the menu option which was identified and frozen in window 30. The time selected until the time counter expires in this case may be some fixed value for all menu options, or it may vary by menu item. For example, the value from the data structure representing the menu item (FIG. 3) may be used. Next, interrupt handler 350 goes to sleep (awaiting the user to indicate whether the menu option which was identified and frozen in steps 310 and 315 is the menu option which the user wants to select) (step 319).

If the display timer clock 131 times-out before the user confirms the menu option that was identified and frozen in window 30, then timer 131 will generate an interrupt which will re-invoke the interrupt handler 350 (step 290). If the user does not confirm the menu option within this time, interrupt handler 350 will assume that the user does not want to make this selection. In response, interrupt handler will identify the nature of the interrupt, reset the selection flag to zero (step 296) and resume sequencing program 128 at step 108 to display the next menu option in the sequence (step 298). However, if the user confirms or rejects the menu option (by an audible command such as "select" or "yes" or "no", or by a keyboard or mouse selection), that was identified and frozen in window 30 in step 315, before the countdown clock 131 times-out, then interrupt handler 350 takes the "NO" branch at step 294 and determines the value of the selection flag to be non-zero at step 304. At this time, the selection flag will equal one, and interrupt handler 350 proceeds to step 327 to determine whether the user input was confirmation or rejection (step 305). If it was "rejection" (decision 327, no branch), the interrupt handler proceeds to step 296 and exits using the same steps as if the timer 131 had expired (step 303). If it was "confirmation" (decision 327, yes branch), the interrupt handler proceeds to step 328 to turn off the timer clock, then proceeds to step 330 to copy the Option ID into the history file 213. Next, interrupt handler 350 calls the application 36 or other computer program which corresponds to the menu option that was selected by the user (as indicated in the data structure for this menu option) (step 332). The application program 36 or other computer program responds to the menu option as described above with reference to step 260, and optionally calls the display time revision program 270 (step 372) as described above with reference to step 272. After processing by the revision program 270, the revision program 270 proceeds to step 100 to reset the selection flag to zero (step 376), and then program 128 continues to steps 102-106 to initiate display of the next menu option.

Program 28 (including programs 128, 250, 350 and 270) can be loaded into computing device 10 from a computer readable media 400 such as a magnetic disk or tape, optical disk, DVD, semiconductor memory, etc. or downloaded via TCP/IP adapter 20 and the Internet.

Based on the foregoing, system, method and computer program for user selection of menu options have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed is:

1. A method for user selection of a menu option, said method comprising the steps of:
    automatically and sequentially displaying a multiplicity of menu options, in a sequence, one at a time, in a display window of a computing device;
    receiving a user selection at a time during the automatic and sequential display of said menu options; and
    automatically determining that said user selection was received within a predetermined period after one of said menu options in said sequence ceased to be displayed in said display window, and in response, automatically determining that said user selection corresponds to said one menu option and performing an action indicated by said one menu option.

2. A method as set forth in claim 1 wherein said user selection was received during display of a next one of said menu options in said sequence.

3. A method as set forth in claim 1 wherein said user selection was received during a blank period after said one menu option ceased to be displayed and before a next one of said menu options in said sequence is displayed.

4. A method for user selection of a menu option, said method comprising the steps of:
    automatically and sequentially displaying a multiplicity of menu options, one at a time, in a display window of a computing device;
    receiving a user selection of a user at a time during the automatic and sequential display of said menu options; and
    preliminarily determining automatically which of said menu options corresponds to said user selection based on the time that said user selection was received in relation to time periods during which said menu options were displayed; and
    wherein, in response to said preliminarily determining step, further comprising the steps of:
        temporarily freezing display of the corresponding menu option in said window and waiting up to a predetermined time period for receipt of confirmation from the user that said user wants to select said corresponding menu option which is frozen in said window, and
        if, within said predetermined time period, said user confirms that said user wants to select said corresponding menu option, automatically determining that said user has selected said corresponding menu option and performing an action indicated by said corresponding menu option, and
        if, within said predetermined time period, said user does not confirm that said user wants to select said corresponding menu option, automatically determining that said user has not selected said corresponding menu option, and automatically resuming sequential display of said multiplicity of menu options without performing said action indicated by said corresponding menu option.

5. A method as set forth in claim 4 wherein within said predetermined time period, said user confirms that said user wants to select said corresponding menu option, and further comprising the step of performing an action, intended by said user by selecting said corresponding menu option.

6. A computer program product for user selection of a menu option, said computer program product comprising:
    a computer readable media;
    first program instructions to automatically and sequentially display a multiplicity of menu options, in a sequence, one at a time, in a display window of a computing device;
    second program instructions to receive a user selection at a time during the automatic and sequential display of said menu options;
    third program instructions to automatically determine that said user selection was received within a predetermined period after one of said menu options in said sequence ceased to be displayed in said display window, and in response, automatically determining that said user selection corresponds to said one menu option and performing an action indicated by said one menu option; and wherein said first, second and third program instructions are stored on said computer readable media in functional form.

7. The computer program product as set forth in claim 6, wherein said user selection was received during display of a next one of said menu options in said sequence.

8. The computer program product as set forth in claim 6, wherein said user selection was received during a blank period after said one menu option ceased to be displayed and before a next one of said menu options in said sequence is displayed.

9. A computer system for user selection of a menu option, the computer system comprising:
    a memory; and
    a processor in communications with the memory, wherein the computer system is capable of performing a method, said method comprising:
        automatically and sequentially displaying a multiplicity of menu options, one at a time, in a display window of a computing device;
        receiving a user selection of a user at a time during the automatic and sequential display of said menu options; and
        preliminarily determining automatically which of said menu options corresponds to said user selection based on the time that said user selection was received in relation to time periods during which said menu options were displayed; and wherein, in response to said preliminarily determining step, further comprising the steps of:

temporarily freezing display of the corresponding menu option in said window and waiting up to a predetermined time period for receipt of confirmation from the user that said user wants to select said corresponding menu option which is frozen in said window, and if, within said predetermined time period, said user confirms that said user wants to select said corresponding menu option, automatically determining that said user has selected said corresponding menu option and performing an action indicated by said corresponding menu option, and if, within said predetermined time period, said user does not confirm that said user wants to select said corresponding menu option, automatically determining that said user has not selected said corresponding menu option, and automatically resuming sequential display of said multiplicity of menu options without performing said action indicated by said corresponding menu option.

10. The computer system as set forth in claim 9, wherein within said predetermined time period, said user confirms that said user wants to select said corresponding menu option, and wherein said method further comprises the step of performing an action, intended by said user by selecting said corresponding menu option.

* * * * *

UNITED STATES PATENT AND TRADEMARK OFFICE
CERTIFICATE OF CORRECTION

| | | |
|---|---|---|
| PATENT NO. | : 7,600,195 B2 | Page 1 of 1 |
| APPLICATION NO. | : 11/285492 | |
| DATED | : October 6, 2009 | |
| INVENTOR(S) | : Timothy D. Greer | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Fifth Day of October, 2010

David J. Kappos
*Director of the United States Patent and Trademark Office*